United States Patent
Uda et al.

(10) Patent No.: US 7,116,908 B2
(45) Date of Patent: Oct. 3, 2006

(54) OPTICAL TRANSMISSION SYSTEM FOR SUBSTANTIALLY EQUALIZING THE OUTPUT SIGNAL LEVEL AMONG FREQUENCY BANDS AND SUBSTANTIALLY LOWERING THE SIGNAL-TO-NOISE RATIO

(75) Inventors: Tetsuya Uda, Yokohama (JP); Hiroshi Masuda, Yokohama (JP); Hirofumi Nakano, Yokohama (JP); Eita Miyasaka, Yokohama (JP); Satoshi Asamizu, Yokohama (JP)

(73) Assignee: Hitachi LTD, Tokyo (JP)

( * ) Notice: Subject to any disclaimer, the term of this patent is extended or adjusted under 35 U.S.C. 154(b) by 538 days.

(21) Appl. No.: 10/076,748

(22) Filed: Feb. 13, 2002

(65) Prior Publication Data
US 2002/0181045 A1    Dec. 5, 2002

(30) Foreign Application Priority Data
Jun. 4, 2001 (JP) ............................ 2001-167609

(51) Int. Cl.
| H04J 14/02 | (2006.01) |
| H04B 10/00 | (2006.01) |
| H01S 3/00 | (2006.01) |
| H01B 10/12 | (2006.01) |

(52) U.S. Cl. ............................ 398/94; 398/92; 398/97; 398/160; 359/337.1; 359/337.11; 359/337.12; 359/341.41; 359/341.42

(58) Field of Classification Search .................. 398/79, 398/94, 92, 160, 62, 64, 97, 173, 175; 359/341.41–42, 359/337.12, 333, 337.1, 348, 337.11
See application file for complete search history.

(56) References Cited

U.S. PATENT DOCUMENTS

| 5,907,429 | A | * | 5/1999 | Sugata | 359/341.42 |
| 6,091,539 | A | * | 7/2000 | Kosaka | 359/341.41 |
| 6,111,688 | A | * | 8/2000 | Kobayashi et al. | 359/337.13 |
| 6,215,583 | B1 | * | 4/2001 | Lagerstrom et al. | 359/341.1 |
| 6,344,914 | B1 | * | 2/2002 | Shimojoh et al. | 398/17 |
| 6,480,329 | B1 | * | 11/2002 | Sugaya et al. | 359/341.42 |
| 6,599,039 | B1 | * | 7/2003 | Nakazato | 398/25 |
| 6,683,713 | B1 | * | 1/2004 | Irie | 359/341.41 |
| 6,804,464 | B1 | * | 10/2004 | Yang | 398/94 |
| 2004/0004756 | A1 | * | 1/2004 | Hainberger et al. | 359/341.3 |

FOREIGN PATENT DOCUMENTS

| JP | 08-223136 | 8/1996 |
| JP | 08-278523 | 10/1996 |
| JP | 09-326770 | 12/1997 |
| JP | 11-055182 | 2/1999 |
| JP | 11-252048 | 9/1999 |
| JP | 11-511619 | 10/1999 |
| JP | 2000-183818 | 6/2000 |
| JP | 2000-252923 | 9/2000 |
| JP | 2001-007768 | 1/2001 |
| JP | 2001-053686 | 2/2001 |

* cited by examiner

Primary Examiner—Jason Chan
Assistant Examiner—Quan-Zhen Wang
(74) Attorney, Agent, or Firm—Knoble Yoshida & Dunleavy, LLC

(57) ABSTRACT

In the WDM systems, the OSNR and the signal loss among the optical signals are substantially minimized at the receiving terminal to combat the SRS effects. An equal amount of the signal loss is expected for every span in the transmission path so that the optical amplifier gain tilt is not affected among a number of wavelength frequencies in the optical signal. This is accomplished by controlling the amplification process according to a feedback from the monitoring units for monitoring the optical signal.

33 Claims, 15 Drawing Sheets (a) SPECTRUM AT FIBER INPUT (b) SPECTRUM AT FIBER OUTPUT

| PRE AMPLIFIER 103 AFTER OUTPUT SPECTRUM | FIBER 400(1) AFTER TRANSMISSION SPECTRUM | LINE AMPLIFIER 203 AFTER OUTPUT SPECTRUM | POST AMPLIFIER 303 AFTER OUTPUT SPECTRUM |
|---|---|---|---|
| 120(1)  | 220(1)  | 230(1)  | 330(1)  |
| 120(2)  | 220(2)  | 230(2)  | 330(2)  |
| 120(3)  | 220(3)  | 230(3)  | 330(3)  |
| 120(4)  | 220(4)  | 230(4)  | 330(4)  |

BEFORE TRANSMISSION → AFTER TRANSMISSION

BEFORE TRANSMISSION → AFTER TRANSMISSION

OPTICAL TRANSMISSION SYSTEM FOR SUBSTANTIALLY EQUALIZING THE OUTPUT SIGNAL LEVEL AMONG FREQUENCY BANDS AND SUBSTANTIALLY LOWERING THE SIGNAL-TO-NOISE RATIO

FIELD OF THE INVENTION

The current invention is generally related to an optical transmission system, and more particularly related to substantially equalizing the output signal level among frequency bands and substantially lowering the signal-to-noise ratio.

BACKGROUND OF THE INVENTION

Wavelength Division Multiplexing (WDM) transmission systems have been used as a means to increase the transmission capacity. WDM allows a single optical fiber to send a plurality of optical signals each with a varying wavelength. Optical fiber amplifiers such as an Erbium Doped Fiber Amplifier (EDFA) simultaneously amplify a wide range of wavelengths. Due to the above simultaneous amplification, the combination of WDM and optical amplifiers enables economical transmission in a large capacity over a long distance with relatively simple structures.

To cover a long distance, optical amplifiers are used in succession for a series of spans or portions. Because the spans are not necessarily equal, the actual placement of the optical amplifiers is also not equidistant. Consequently, the amount of transmission loss varies for each span. For the above varying transmission loss, the input optical level to an optical amplifier is not constant for each optical amplifier, and the gain tilt occur among optical signals with different wavelengths.

The above gain tilt is accumulated over multiple optical amplifiers that are connected to a single optical fiber. At a final receiving unit, the gain tilt appears as a significant problem over a long distance. Since the gain tilt may exceed a predetermined reception dynamic range of a receiving unit, acceptable reception may not be possible. The optical signal levels during the transmission also vary among the wavelengths, and each optical signal receives a varying non-liner effect. Because of the above reasons, the optical signal waveform is affected for each wavelength.

The WDM optical gain transmission generally requires an optical signal at a high input level to be entered into an optical fiber in order to implement a long distance transmission system. It is concerned that the above described non-linear degrading effect on transmission would be further exaggerated due to the high optical input signal level. One of the non-linear effects is Stimulated Raman Scattering (SRS), which causes excessive loss or gain in optical signals. SRS is a non-linear optical process where a portion of the optical fiber input signal acts as stimulating light and energy moves from high-frequency signals to low-frequency signals by interacting with the low-frequency signals in the optical fibers. Although SRS occurs in all optical fibers, the effect depends upon the type of fibers and the frequency difference between the optical signals that are involved in energy transfer.

There is a number of factors for the amount of the above described energy transfer. The energy transfer is proportional to the sum of the output optical strength. The more wavelengths there are and the wider the wavelength range is in the WDM apparatus, the larger the amount of the energy transfers. As a result, the SRS effect is more typically seen. Further, the longer the transmission path is, the more apparent the SRS effect becomes. Under the influence of the SRS effect, the WDM transmission experiences a varying Optical Signal to Noise Ratio (OSNR) among the optical signals with a different wavelength since the wavelength signal level discrepancy occurs during transmission and the optical input level varies for each optical amplifier. Similar to the inter-wavelength gain tilt, the optical output strength also varies for each wavelength during transmission. As a result of the varying output strength, the reception waveform also experiences wavelength-dependent waveform distortions and transmission errors due to self phase modulation and wavelength dispersion as well as frequency chirping.

Prior art WDM systems had operated with a relatively small number of wavelengths and a relatively narrow range of frequencies in optical signals. For the above reasons, the effect of the inter-wavelength gain tilt and the SRS-induced signal level discrepancy had not been significant. Contrarily, as the communication traffic has increased in the recent years, the WDM systems have been demanded to cover a longer distance, to accommodate a larger number of frequency signals and to widen a range of the frequency. As a result of the added requirements, the effect of the inter-wavelength gain tilt and the SRS-induced signal level discrepancy can be no longer ignored. It has been reported in academics that transmission becomes disabled due to the above described increased SRS effects when the initial design capacity for the wavelengths is reached in the WDM systems.

To deal with the above described undesirable effects in the WDM systems, prior art has considered the discrepancy in gain tilt in optical amplifiers and the wavelength-dependent loss in the transmission path. For example, Japanese Patent Publication Hei 8-223136 discloses a method of minimizing the gain tilt in the optical amplifiers to obtain the minimal OSNR. Another example is Japanese Patent Publication Hei 11-55182, which discloses a method of minimizing the optical signal level discrepancy and the OSNR at a receiving end. The above prior art methods are useful for the situations where the optical signal loss amount is equal among the spans in the transmission path. Alternatively, the above prior art is also useful if the optical signal loss and the optical amplifier gain tilt are not affected by a number of wavelength frequencies in the optical signal to be inputted in an optical amplifier. Unfortunately, the above described prior art technologies do not account for the situations where the optical signal loss amount is not equal among the spans in the transmission path. The above prior art technologies also fail consider that the optical signal output strength is different among a number of wavelength frequencies or ranges of frequencies in the optical signal.

Japanese Patent Publication 2000-183818 discloses the method of adjusting optical signal strength at a transmission side for each wavelength by pre-emphasis so as to stabilize the OSNR at a receiving side. However, the above method depends upon a range and a number of frequencies, and the discrepancy or tilt in signal level among the optical signals may exceed the pre-emphasis guaranty.

For the above described reasons, it is desirable to guarantee the OSNR among the optical signals at the receiving terminal in the WDM systems. In other words, it is desirable to guarantee an equal optical signal loss amount among the spans in the transmission path so that the optical amplifier gain tilt is not affected among a number of wavelength frequencies in the optical signal. Furthermore, it is also desirable to guarantee the signal level among frequencies due to SRS during the optical fiber transmission.

SUMMARY OF THE INVENTION

In order to solve the above and other problems, according to a first aspect of the current invention, a method of controlling optical signal during transmission, including the steps of: transmitting a wave division multiplexed optical signal having a predetermined set of ranges of wavelengths; amplifying the wave division multiplexed optical signal to generate an amplified wave division multiplexed optical signal; monitoring a total optical strength level of one of the ranges of the amplified wave division multiplexed optical signal; monitoring a probe optical strength level of one of the wavelengths of the amplified wave division multiplexed optical signal; and adjusting the amplification based upon the total optical strength level and the probe optical strength level so as to substantially reduce a gain tilt and an optical signal-to-noise ratio in the amplified wave division multiplexed optical signal.

According to a second aspect of the current invention, a system for controlling optical signal during transmission, including: a first and second optical fibers for transmitting a wave division multiplexed optical signal having a predetermined set of ranges of wavelengths; an amplifier connected to the first optical fiber for amplifying the wave division multiplexed optical signal according to a predetermined amplification characteristic to generate an amplified wave division multiplexed optical signal, the amplifier outputting the amplified wave division multiplexed optical signal to the second optical fiber; a first monitor connected to the second optical fiber for monitoring a total optical strength level of one of the ranges of the amplified wave division multiplexed optical signal; a second monitor connected to the second optical fiber for monitoring a probe optical strength level of one of the wavelengths of the amplified wave division multiplexed optical signal; and an adjustment unit connected to the amplifier, the first monitor and the second monitor for adjusting the amplification characteristic based upon the total optical strength level and the probe optical strength level so as to substantially reduce a gain tilt and an optical signal-to-noise ratio in the amplified wave division multiplexed optical signal.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
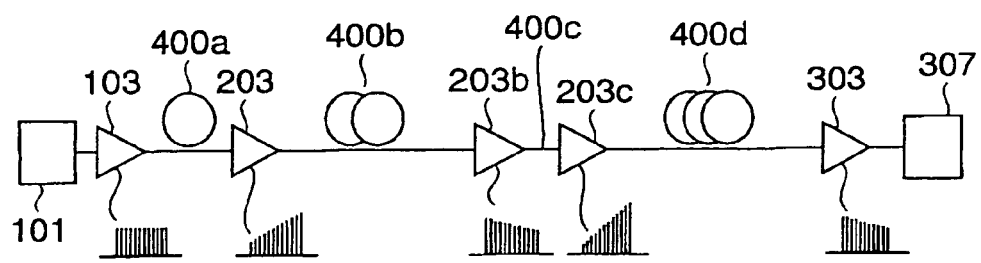
FIG. 1 is a diagram illustrating a Wavelength Division Multiplexing (WDM) transmission system in which optical amplifiers generate a varying gain tilt among wavelengths due to a different amount of transmission loss per span.

Referring now to the drawings, wherein like reference numerals designate corresponding structures throughout the views, and referring in particular to FIG. 1, a diagram illustrates that optical amplifiers generate a varying gain tilt among wavelengths due to a different amount of transmission loss per span in the Wavelength Division Multiplexing (WDM) transmission system. An optical transmission device 101 transmits wavelength division multiplexed signals towards a preamplifier 103. The preamplifier 103 amplifies the wavelength division multiplexed signals and transmits the amplified division multiplexed signals in an optical fiber 400a towards a line amplifier 203a. During the transmission via the optical fiber 400a, the wavelength division multiplexed signals experience signal loss. The line amplifier 203a amplifies the wavelength division multiplexed signals after the signal loss and further transmits the amplified signal via an optical fiber 400b. The above described process is repeated as illustrated by additional line amplifiers 203b and 203c as the division multiplexed signals travel through an optical fiber portion 400c and 400d. A different number of circles at the optical fiber portions 400a, 400b, 400c and 400d denoted a varying distance for a corresponding span. Before the division multiplexed signals reach a reception unit 307, a post amplifier 303 amplifies the division multiplexed signals.

Still referring to FIG. 1, at each of the amplifiers 103, 203a, 203b, 203c and 303, a spectrum of the division multiplexed signals is illustrated below the corresponding one of the amplifier symbols. The spectrum is illustrated to express the wavelength in the x axis and the optical signal strength in the y axis. As shown in the diagram, since the distance between amplifiers or the span in the long distance multi-stage transmission path varies, the signal loss also varies for each span. In general, to control the optical strength in the output signal from the optical amplifiers, the optical strength of the input signal to the optical amplifiers is often limited to a predetermined value. For example, when the optical input signal is maintained at −5.5 dBm, although an average output light strength level is constant for each span, the gain tilt still exists among optical signals at different wavelengths.

Figure 2A:
FIG. 2A is a graph illustrating a predetermined input level across the above wavelength ranges.
Figure 2B:
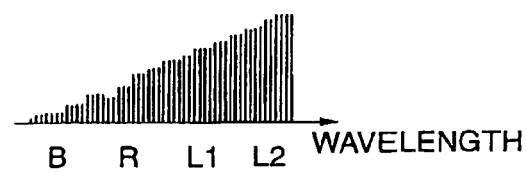
FIG. 2B is a graph illustrating that the output optical signal level is higher at the long wavelength ranges than that at the short wave length ranges.

Now referring to FIG. 2, graphs illustrate the effect of SRS on the signal level of various wavelength-based optical signals. In general, an x-axis represents wavelength while a y-axis represents an output level or optical strength of the wavelength division multiplexed optical signals across the wavelength spectrum. For example, wavelength ranges B, R, L1 and L2 respectively range from 1530 nm to 1545 nm, from 1545 to 1560, from 1560 nm to 1575 nm and from 1575 nm to 1590 nm. In particular, referring to FIG. 2A, a predetermined input level is maintained across the above wavelength ranges B, R, L1 and L2. Despite the same input optical signal strength level across the wavelength ranges B, R, L1 and L2, FIG. 2B illustrates that the output optical signal level is higher at the long wavelength ranges L1 and L2 than that at the short wave length ranges B and R. In fact, the output optical strength sequentially increases from the shortest range B to the longest range L2. The above described gain tilt occurs due to the energy transfer from the short wavelength optical signals to the long wavelength optical signals.

Figure 3:
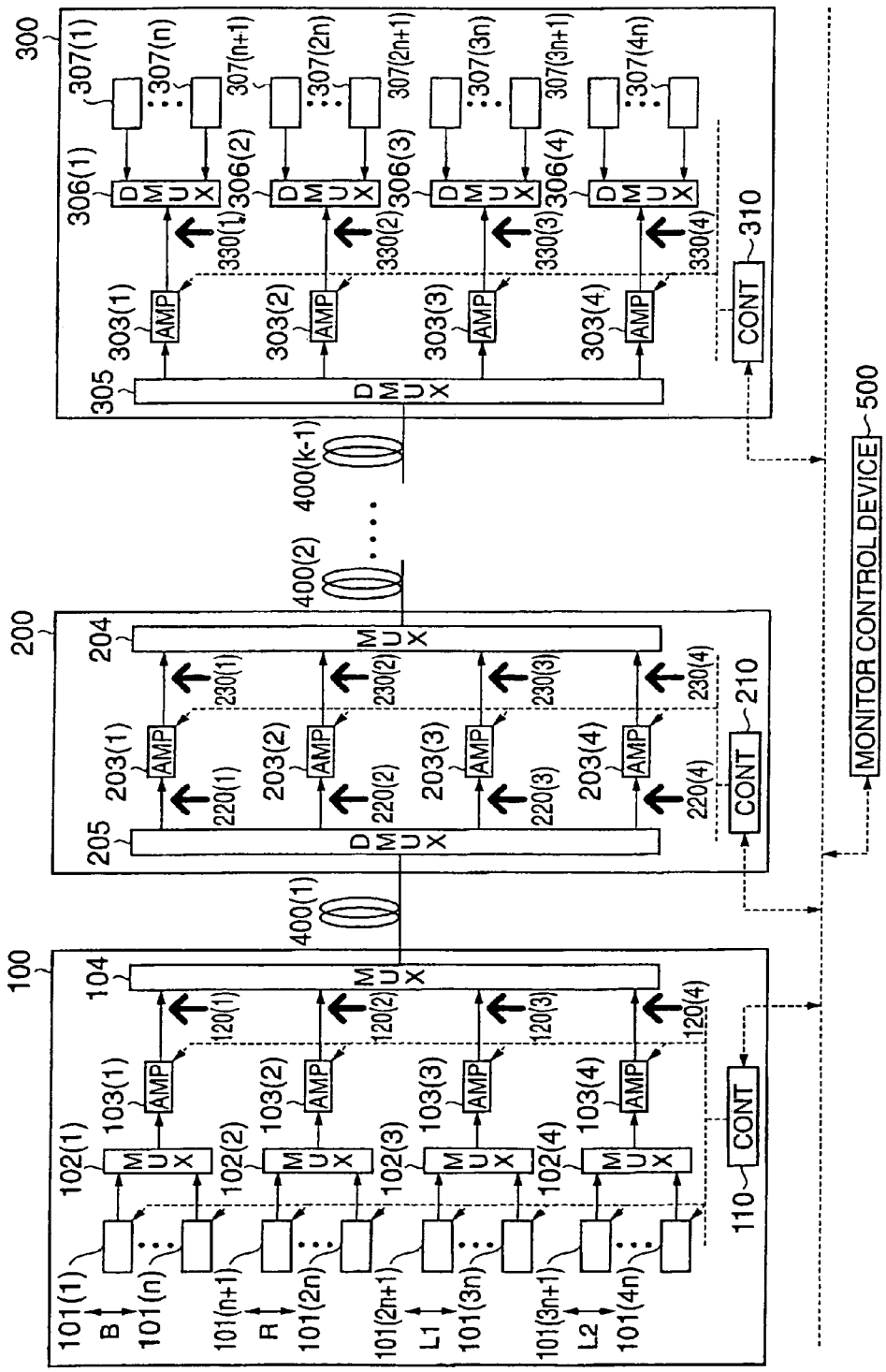
FIG. 3 is a diagram illustrating one preferred embodiment of the WDM systems for transmitting optical signals according to the current invention.

FIG. 3 is a diagram illustrating one preferred embodiment of the WDM systems for transmitting optical signals according to the current invention. In general, the preferred embodiment includes a transmitting terminal device 100, an intermediate station or booster device 200, a receiving terminal device 300, optical fibers 400(1) through 400(k−1) that connect the above devices 100, 200 and 300 as well as a monitor control device 500. Since the monitor control device 500 controls and monitors the entire system, the monitor control device 500 is provided separately from other devices. In the preferred embodiment, four separate wavelength bands B, R, L1 and L2 respectively cover a range from 1530 nm to 1545 nm, from 1545 to 1560, from 1560 nm to 1575 nm and from 1575 nm to 1590 nm. For each of the ranges B, R, L1 and L2, a separate amplifier is provided for amplifying the optical signals in the transmitting terminal device 100, the intermediate station or booster device 200 and the receiving terminal device 300. For each of the above described amplifiers, a predetermined number N of optical signals is multiplexed with a varying wavelength.

Still referring to FIG. 3, each of the above devices 100, 200 and 300 is described in the following. The transmitting terminal device 100 further includes a set of optical transmitters for each range of the wavelength optical signals. For the B band, the optical transmitters 101(1) through 101(n) transmit a predetermined n number of optical signals with a varying wavelength. A corresponding multiplexer 102(1) wavelength-division multiplexes the transmitted optical signals from the optical transmitters 101(1) through 101(n). Subsequently, a corresponding amplifier 103(1) amplifies the wavelength-division multiplexed optical signal from the multiplexer 102(1). Similarly, for the R band, the optical transmitters 101(n+1) through 101(2n) transmit an additional n number of optical signals with a varying wavelength. A corresponding multiplexer 102(2) wavelength-division multiplexes the transmitted optical signals from the optical transmitters 101(n+1) through 101(2n). Subsequently, a corresponding amplifier 103(2) amplifies the wavelength-division multiplexed optical signal from the multiplexer 102(2). For the L1 band, the optical transmitters 101(2n+1) through 101(3n) transmit an additional n number of optical signals with a varying wavelength. A corresponding multiplexer 102(3) wavelength-division multiplexes the transmitted optical signals from the optical transmitters 101(n+1) through 101(3n). Subsequently, a corresponding amplifier 103(3) amplifies the wavelength-division multiplexed optical signal from the multiplexer 102(3). For the L2 band, the optical transmitters 101(3n+1) through 101(4n) transmit an additional n number of optical signals with a varying wavelength. A corresponding multiplexer 102(4) wavelength-division multiplexes the transmitted optical signals from the optical transmitters 101(3n+1) through 101(4n). Subsequently, a corresponding amplifier 103(4) amplifies the wavelength-division multiplexed optical signal from the multiplexer 102(4). Lastly, a second multiplexer 104 further wavelength-division multiplexes the amplified wavelength-division multiplexed optical signals from the amplifiers 101(1) through 101(4) to transmit the multiplexed optical signal to the booster device 200 via the optical fiber 400(1).

The booster device 200 further includes a wavelength-division demultiplexer 205, a set of optical amplifiers 203(1) through 203(4) and a wavelength-division multiplexer 204. The wavelength-division demultiplexer 205 demultiplexes the wavelength-division multiplexed optical signals from the transmitting device 100 into the four wavelength ranges B, R, L1 and L2. For each of the demultiplexed bands B, R, L1 and L2, line amplifiers 203(1) through 203(4) respectively amplify the optical signals to compensate the corresponding transmission loss. The optically amplified signals are again wavelength-division multiplexed in a multiplexed 204. The multiplexed signals are transmitted via optical fibers 400(2). Although FIG. 2 abbreviates the repetition of the above described booster devices by the dotted line, a series of the booster devices and corresponding optical fibers through a final optical fiber portion 400(k−1) are placed depending upon a transmission distance to the receiving device 300.

Still referring to FIG. 3, the reception device 300 further includes a demultiplexer 305 to demultiplex the wavelength-division multiplexed input signal from the optical fiber 400(k−1) into the original four bands B, R, L1 and L2. Post amplifiers 303(1) through 303(4) respectively amplify the demultiplexed optical signals for the four bands B, R, L1 and L2. A set of additional demultiplexers 305(1) through 305(4) further demultiplexes the amplified initially demultiplexed band signals. For the B band, the demultiplexer 306(1) demultiplexes the optical signal to generate the originally corresponding optical signals for optical receivers 307(1) through 307(n). Similarly, for the R band, the demultiplexer 306(2) demultiplexes the optical signal to generate the originally corresponding optical signals for optical receivers 307(n+1) through 307(2n). For the L1 band, the demultiplexer 306(3) demultiplexes the optical signal to generate the originally corresponding optical signals for optical receivers 307(2n+1) through 307(3n). Lastly, for the L2 band, the demultiplexer 306(4) demultiplexes the optical signal to generate the originally corresponding optical signals for optical receivers 307(3n+1) through 307(4n).

Figure 4:
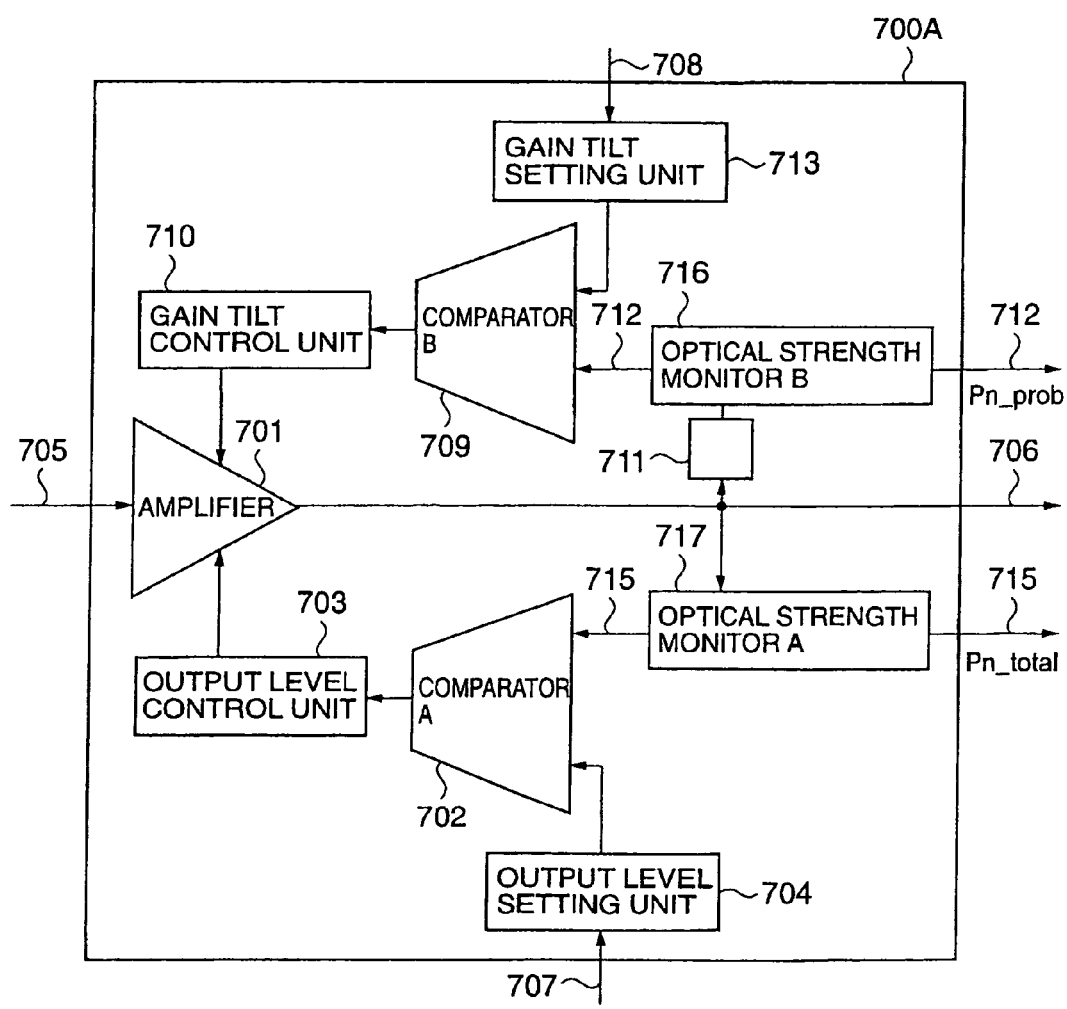
FIG. 4 is a diagram illustrating a first preferred embodiment of the optical amplifier according to the current invention.

Now referring to FIG. 4, a diagram illustrates a first preferred embodiment of the optical amplifier according to the current invention. The diagram illustrates that an optical amplifier 700A monitors a total output optical strength Pn_total 715 and an output probe optical strength Pn_prob 712 for an optical wavelength signal that is included in the WDM optical signal. Alternatively, the output probe optical strength Pn_prob 712 is in a predetermined amplification range. In general, the optical amplifier 700A simultaneously controls the total output optical strength 715 in the amplification range and the gain tilt. In particular, an amplifier 701 amplifies an optical input signal 705 and outputs an optical output signal 706. An output level control unit 703 controls the output strength of the amplifier 701 while a gain tilt control unit 710 controls the gain tilt of the amplifier 701. An output level setting unit 704 stores an external signal 707 for specifying a target optical output signal strength level. A gain tilt setting unit 713 stores an external signal 708 for specifying the gain tilt. The external signal 708 is an average optical strength that is determined by dividing the total output optical strength Pn_total 715 by a number of wavelengths that is amplified by the amplifier 701. A narrow optical range filter 711 filters out a certain wavelength probe signal from the amplified output signal from the amplifier 701 and inputs the filtered wavelength probe signal to an optical strength monitor B 716. The optical strength monitor B 716 converts the optical wavelength probe signal to an electrical signal Pn_prob 712.

Still referring to FIG. 4, similarly, an optical strength monitor A 717 receives the amplified output signal from the amplifier 701 and converts the optical signal to an electrical signal Pn_total 715. A comparator B 709 compares the gain tilt value from the gain tilt setting unit 713 and the electrical signal Pn_prob 712 from the optical strength monitor B 716. The output of the comparator B 709 is inputted into a gain tilt control unit 710. Based upon the comparison result from the comparator B 709, the gain tilt control unit 710 automatically controls the amplifier 701 so as to generate the optical probe signal Pn_prob 712 at a level that is stored in the gain tilt setting unit 713. If the above comparison result from the comparator B 709 is negative, the control performs to negate the negative in the output. On the other hand, a comparator A compares the optical output strength from the target output level setting unit 704 and the electrical signal Pn_total 715 from the optical strength monitor A 717. The output of the comparator A 702 is inputted into an output level control unit 703. Based upon the comparison result from the comparator A 702, the output level control unit 703 automatically controls the amplifier 701 so as to generate the optical output signal 706 at a level that is stored in the output level setting unit 707. If the above comparison result from the comparator A 702 is negative, the control performs to negate the negative in the output.

Figure 5:
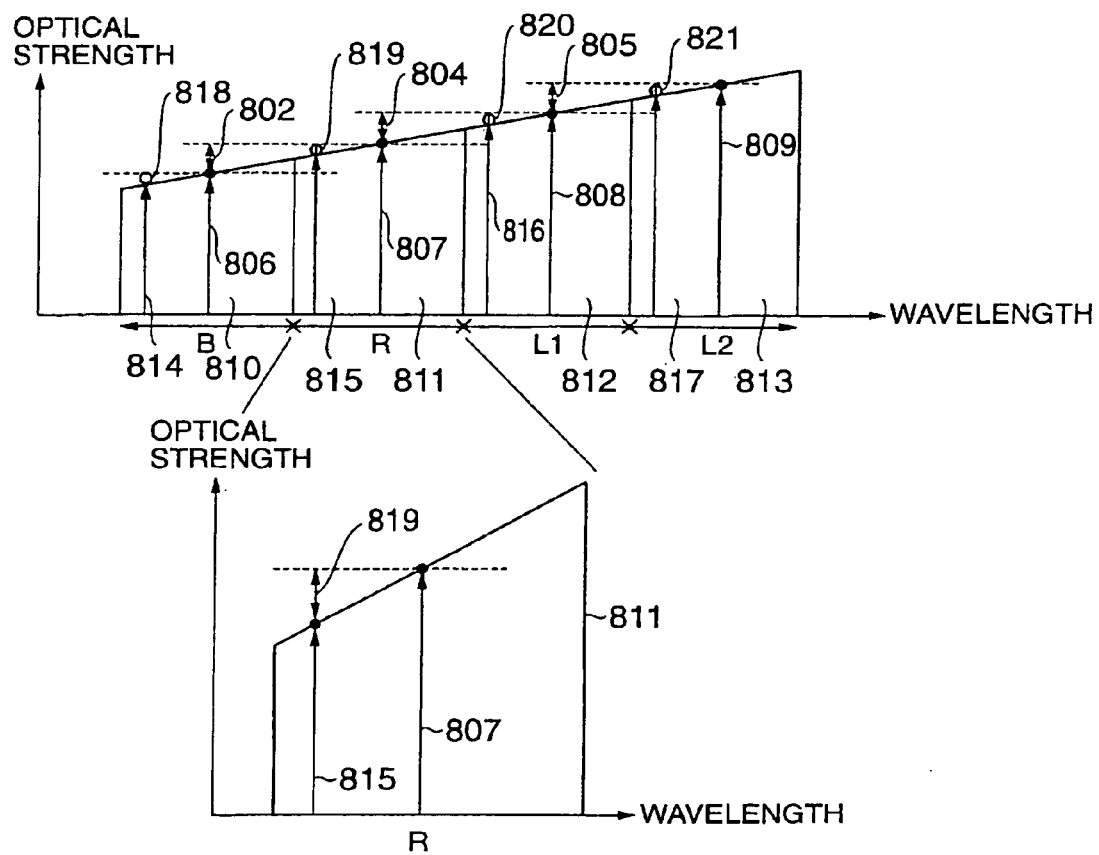
FIG. 5 is a graph illustrating an exemplary spectrum of an optical signal for determining a total optical strength level, an average optical strength level and a gain tilt.

FIG. 5 is a graph illustrating an exemplary spectrum of an optical signal for determining a total optical strength level, an average optical strength level and a gain tilt. The optical signal includes four bands or frequency ranges B, R, L1 and L2. For each of the bands B, R, L1 and L2, the total optical strength level includes a B-band total optical strength level 810, a R-band total optical strength level 811, a L1-band total optical strength level 812 and a L2-band total optical strength level 813. For each band, the total optical strength level is divided by a number of wavelengths involved in the corresponding band to determine the average optical strength level. In other words, the following Equation(1) holds:

Probe Light=(average optical strength)=(total optical strength )/(a number of wavelengths)

The average optical strength level includes a B-band average optical strength level 806, a R-band average optical strength level 807, a L1-band average optical strength level 808 and a L2-band average optical strength level 809. Furthermore, for each band, an optical probe signal is determined and includes a B-band optical probe signal 814, a R-band optical probe signal 815, a L1-band optical probe signal 816 and a L2-band optical probe signal 817.

Still referring to FIG. 5, certain parameters are determined based upon a comparison of the above described values. By comparing the average optical strength level and the optical probe signal for each band, a gain tilt is determined between the bands at the output side. Between the B-band and the R-band, a B-R inter band gain tilt is determined to be a gain tilt 802. Similarly, between the R-band and the L1-band, a R-L1 inter band gain tilt is determined to be a gain tilt 804. Between the L1-band and the L2-band, a L1–L2 inter band gain tilt is determined to be a gain tilt 805. By comparing the average optical strength level and the optical probe signal for each band, a gain tilt is determined within each of the bands. An inter-band gain tilt 818 is determined for the B-band while an inter-band gain tilt 819 is determined for the R-band. To clearly define the R inter-band tilt gain 819, a portion of the diagram that corresponds to the R-band is enlarged. The R inter-band tilt gain 819 is a difference between the R-band optical probe signal 815 and the R-band average optical strength level 807. Similarly, an inter-band gain tilt 820 is determined for the L1-band while an inter-band gain tilt 821 is determined for the L2-band. The above described parameters are simultaneously determined.

Now referring back to FIG. 4, a diagram illustrates a preferred embodiment of the optical amplifier unit according to the current invention. The preferred embodiment monitors determines the output level 706 at a desired level for optical signals across the frequency band. As described above, based upon the information in the output level setting unit 704, the output level control unit 703 controls the amplifier 701 to generate the output optical signal 706 at a desired level. The gain tilt setting unit 713 stores a gain tilt setting value that is compared to the output signal from the optical strength monitor B 716. In the preferred embodiment, the stored gain tilt value is an average optical strength value so that the comparison allows the gain tilt control unit 710 to control the amplifier 701 to generate the output optical signal 706 at a constant strength across the wavelength.

Figure 6:
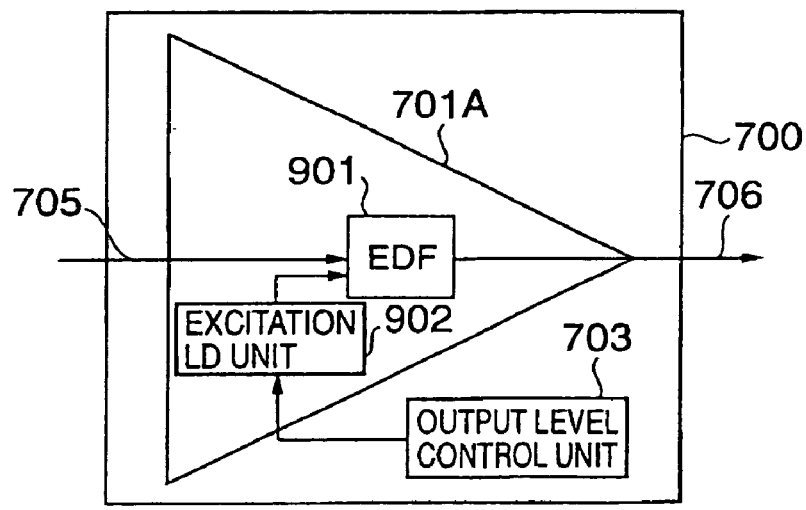
FIG. 6 is a diagram illustrating one exemplary implementation of the above described output level control in the preferred embodiment according to the current invention.

To control the above described parameters such as the output level and the gain tilt, the optical output signal 706 from the optical amplifier 700A is adjusted in the preferred embodiment according to the current invention. Referring to FIG. 6, a diagram illustrates one exemplary implementation of the above described output level control in the preferred embodiment according to the current invention. The amplifier 701A further includes an EDF 901 and an excitation LD unit 902. The output level control unit 703 inputs a signal indicative of the desired output level into the excitation LD unit 902, which in turn excites the EDF 901 for amplifying the input optical signal 705 to the output optical signal 706.

Figure 7:
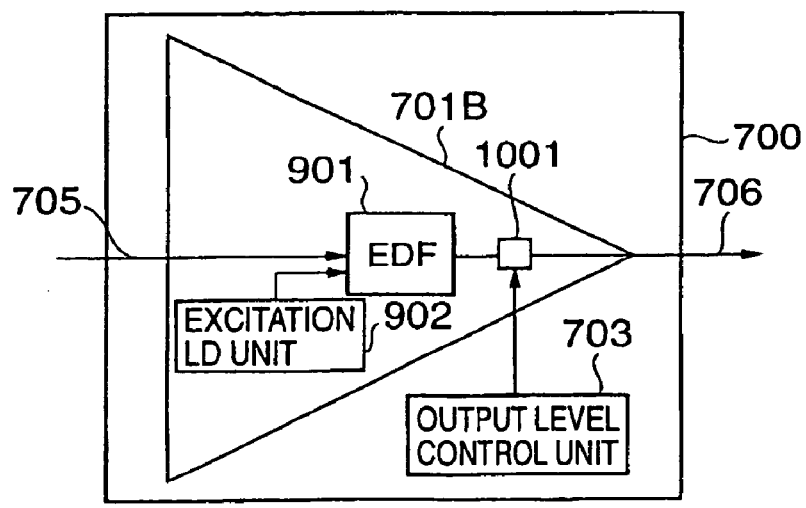
FIG. 7 is a diagram illustrating another exemplary implementation of the above described output level control in the preferred embodiment according to the current invention.

Alternatively, referring to FIG. 7, a diagram illustrates another exemplary implementation of the above described output level control in the preferred embodiment according to the current invention. The amplifier 701B further includes an EDF 901, an excitation LD unit 902 and a variable attenuator 1001. The output level control unit 703 inputs a signal indicative of the desired output level into the attenuator 1001, which in turn attenuates an optical output signal from the EDF 901 after amplifying the input optical signal 705 via an excitation LD unit 902. Lastly, referring to FIG. 8, a diagram illustrates yet another exemplary implementation of the above described gain tilt control in the preferred embodiment according to the current invention. The amplifier 701C further includes an EDF 901, an excitation LD unit 902 and a variable gain tilt adjustment unit 1002. The gain tilt control unit 710 inputs a signal indicative of the desired gain tilt level into the gain tilt adjustment unit 1002, which in turn adjusts an optical output signal from the EDF 901 after amplifying the input optical signal 705 via an excitation LD unit 902. The variable gain tilt adjustment unit 1002 adjusts the output strength among optical signals with a variable wavelength.

Figure 9:
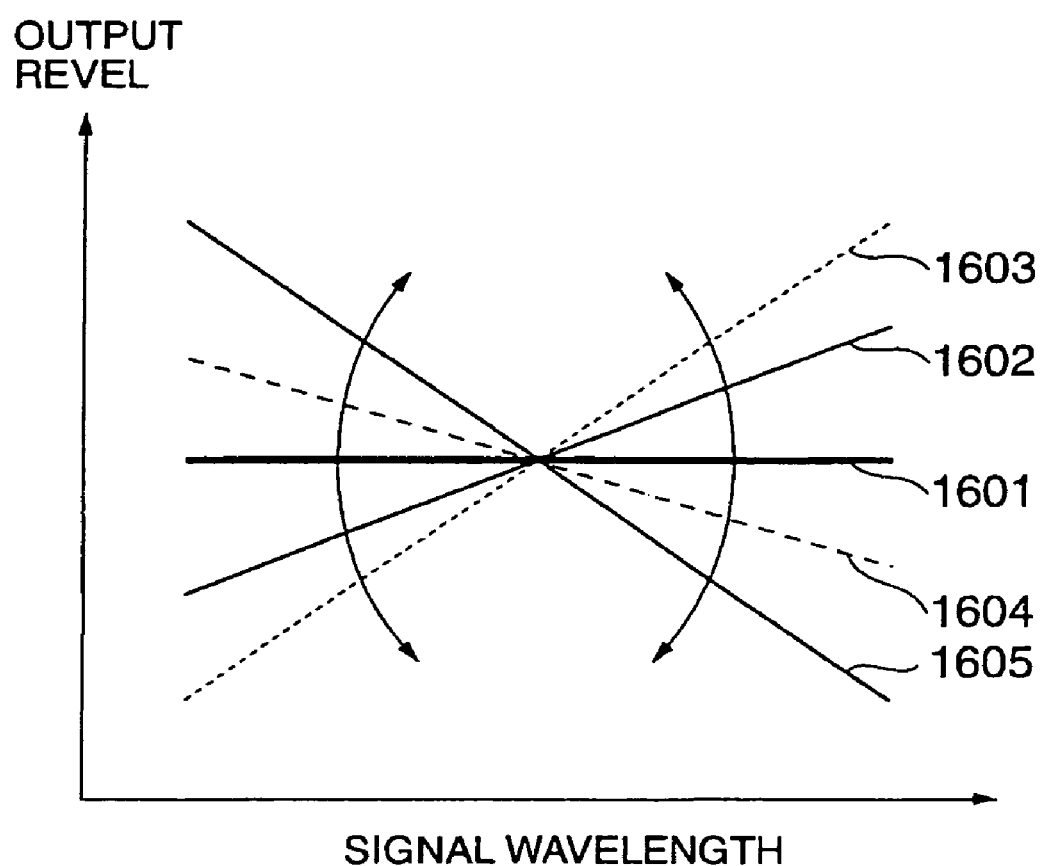
FIG. 9 is an exemplary graph illustrating various degrees of gain tilt.

The gain tilt control is illustrated in an exemplary graph in FIG. 9. The x axis of the graph represents a range of wavelengths while the y axis of the graph represents an output level. A line 1601 represents a range of predetermined optical signals within a predetermined range of frequencies, and the line 1601 indicates that the output optical level is uniform within the frequency range. On the other hand, lines 1602 and 1603 indicate a situation where the output signal level at the high frequency side is lower than that at the low frequency side. Lines 1604 and 1605 indicate a situation where the output signal level at the high frequency side is higher than that at the low frequency side.

Figure 10:
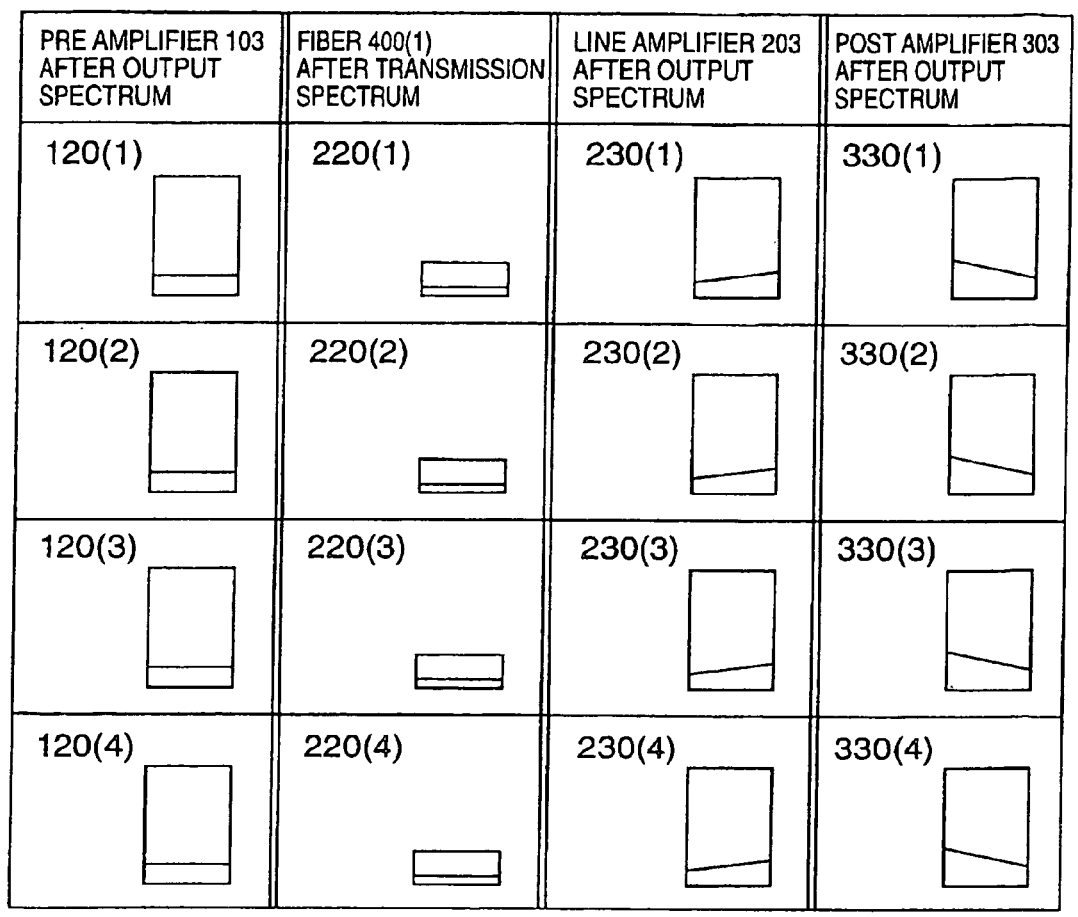
FIG. 10 is a diagram illustrating one example of adjusted gain tilt during the multi-stage transmission.
Figure 11:
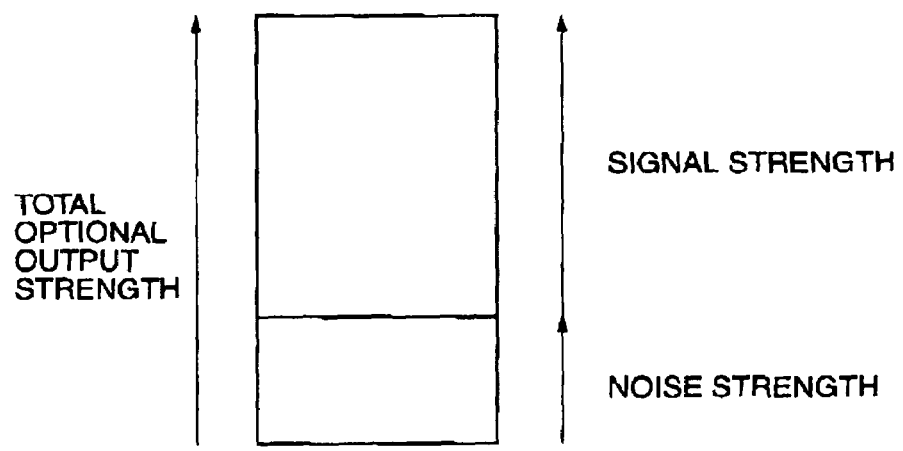
FIG. 11 is a diagram illustrating a total optical signal including a signal strength portion at the top and a noise strength portion below the signal strength.

Having explained one preferred embodiment of the gain tilt adjustment in the WDM transmission system, the adjusted gain tilt during the multi-stage transmission is further illustrated in FIG. 10. As described before, the transmission loss varies depending upon the distance of each span. FIG. 10 is a diagram illustrating optical signals at various stages of the transmission at the preamplifiers 103(1) through 103(4), the line amplifiers 203(1) through 203(4) and the post amplifiers 303(1) through 303(4) as shown in FIG. 3. The diagram illustrates the situation where the input optical signals have a relatively narrow frequency range and a number of the optical signal at a varying wavelength is also relatively small in the frequency range. Under the above described circumstances, the effects of SRS are insignificant and are ignored. To interpret the optical signals at the various transmission stages as shown in FIG. 10, a total optical signal is represented by the sum of a signal strength portion at the top and a noise strength portion below the signal strength portion as shown in FIG. 11.

Still referring to FIG. 10, the diagram further illustrates the effects of the SRS at various points in the transmission and the processing results by the first preferred embodiment of the optical amplifier according to the current invention. The various points include the preamplifier, the line amplifier and the post amplifier as shown in FIG. 3. The exemplary signal includes four bands as illustrated in FIG. 2 and is transmitted in the above transmission path. In the following descriptions of FIG. 10, references are made to the elements in FIGS. 2 and 3. The WDM optical signal loses some optical strength after being transmitted through the optical fiber 400(1). As shown in the second column in FIG. 10, the optical signal generally has a lower energy level and evenly across the entire spectrum at the points 220(1) through 220(4) prior to amplification. The line amplifiers 203(1) through 203(4) amplify the respective weakened optical signal to a predetermined level with a uniform gain as shown in the third column in FIG. 10. The amplified signals in the third column are taken at points 230(1) through 230(4) subsequent to amplification by the line amplifiers 203(1) through 203(4). The above described amplification is repeated for each span until the signal is transmitted to the receiving unit 300 so that the output from the post amplifiers 303(1) through 303(4) are also at a predetermined level with a uniform gain. The amplified signals in the fourth column are taken at points 330(1) through 330(4) subsequent to amplification by the post amplifiers 303(1) through 303(4). Alternatively, the above described amplification is performed on certain spans until the signal is transmitted to the receiving unit.

The optical signal to noise ratio (SNR) in the optical signals are somewhat wavelength dependent at the points 230(1) through 230(4) in the output from the line amplifiers 203(1) through 203(4) and the points 330(1) through 330(4) in the output from the post amplifiers 303(1) through 303(4). In other words, the optical signals at the points 230(1) through 230(4) have a higher noise ratio in high frequencies while the optical signals at the points 330(1) through 330(4) have a higher noise ratio in low frequencies. As described with respect to FIG. 1 the noise ratio depends upon the transmission distance of the optical fibers 400, which results in a different input level to a corresponding optical amplifiers 203(1) through 203(4) and 303(1) through 303(4). Thus, even though the initial optical signals have the equal optical strength, an increasing or decreasing gain tilt results based upon the above factor. Even though the gain tilt compensation is performed, the effects of the above described causes for the undesirable gain tilt may not be completely eliminated. On the other hand, when the spans are short and or a number of wavelength division multiplexed frequencies is relatively small, the SRS effect is minimal. As the result, the gain tilt is relatively small and the optical SNR among the bands is controlled to an acceptable level.

Figure 12:
FIG. 12 is a diagram illustrating another example of adjusted gain tilt during the multi-stage transmission.
Figure 12:
Figure 12:
Figure 12:
Figure 12:
Figure 12:
Figure 12:
Figure 12:
Figure 12:
Figure 12:
Figure 12:
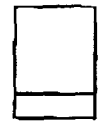
Figure 12:
Figure 12:
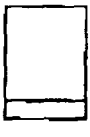
Figure 12:
Figure 12:
Figure 12:

Now referring to FIG. 12, a diagram illustrates the exemplary effects of the SRS at various points in the transmission and the processing results by the first preferred embodiment of the optical amplifier according to the current invention. The exemplary signal includes four bands as illustrated in FIG. 2 and is transmitted in the above transmission path. The optical signals are illustrated at various stages of the transmission at the preamplifiers 103(1) through 103(4), the line amplifiers 203(1) through 203(4) and the post amplifiers 303(1) through 303(4) as shown in FIG. 3. The diagram illustrates the situation where the input optical signals have a relatively wide frequency range and a number of the optical signal at a varying wavelength is also relatively large in the frequency range. Under the above described circumstances, the effects of SRS are substantially significant and cannot be ignored. To interpret the optical signals at the various transmission stages as shown in FIG. 12, a total optical signal is represented by the sum of a signal strength portion at the top and a noise strength portion below the signal strength portion as shown in FIG. 11.

Still referring to FIG. 12, the diagram further illustrates the effects of the SRS at various points in the transmission and the processing results by the first preferred embodiment of the optical amplifier according to the current invention. The various points include ones with respect to the preamplifier, the line amplifier and the post amplifier as shown in FIG. 3. The exemplary signal includes four bands as illustrated in FIG. 2 and is transmitted in the above transmission path. In the following descriptions of FIG. 12, references are made to the elements in FIGS. 2 and 3. The WDM optical signal loses some optical strength after being transmitted through the optical fiber 400(1). As shown in the second column in FIG. 12, the optical signal generally has a lower energy level but unevenly across the entire spectrum at the points 220(1) through 220(4) prior to amplification. Due to the SRS effects, some gain tilt has occurred in the optical signals at the points 220(1) through 220(4). In general, the optical strength is higher at high frequencies than at lower frequencies. The line amplifiers 203(1) through 203(4) amplify the respective weakened optical signal to a predetermined level with a uniform gain as shown in the third column in FIG. 12. The amplified signals in the third column are taken at points 230(1) through 230(4) subsequent to amplification by the line amplifiers 203(1) through 203(4). Although the output level and the gain tilt are controlled in the spectrums 230(1) through 230(4) in the output form the line amplifiers 203(1) through 203(4), the optical SNR varies within a band and among the bands due to the interaction between the gain tilt caused by the SRS effects and that caused by the input level to the optical amplifiers 203(1) through 203(4). In comparison to the short wavelength bands such as the band B as shown in the spectrum 230(1), the longer the wavelength is, the more optimal the optical SNR becomes. In fact, the most optimal SNR is seen in the longest wavelength band L2 as shown in the spectrum 230(4) in which the noise component is the least. The above described amplification is repeated for each span until the signal is transmitted to the receiving unit 300 so that the output from the post amplifiers 303(1) through 303(4) are also at a predetermined level with a uniform gain. The amplified signals in the fourth column are taken at points 330(1) through 330(4) subsequent to amplification by the post amplifiers 303(1) through 303(4).

The optical signal to noise ratio (SNR) in the optical signals is wavelength dependent due to the input level to the line amplifiers 203(1) through 203(4) and the SRS effects in the optical fiber 400(1) during transmission. As shown in FIG. 12, the above wavelength dependency exists not only within a band but also among the bands. Contrary to the above example, in some case, the shorter wavelength is, the more optimal the optical SNR becomes. The gain tilt discrepancy is caused by the varying input level to the optical amplifier as a result of a varying amount of transmission loss per span. Because of the combined effects of the gain tilt discrepancy and the SRS effects during the transmission, the wavelength-dependency of the optical SNR ultimately becomes significant. As illustrated in the fourth column of the diagram in FIG. 12, the optical SNR is becomes better as the wavelength also becomes longer with in a band or among the bands. In fact, in the longest wavelength band L2, the optical SNR becomes the best as shown in the spectrum 330(4). The discrepancy in the optical SNR is substantial among the spectra 330(1) through 330(4). Under the conditions with the significant wavelength-dependency of the optical SNR, it becomes difficult to correctly receive the entire spectrum of the WDM optical signal.

Figure 13:
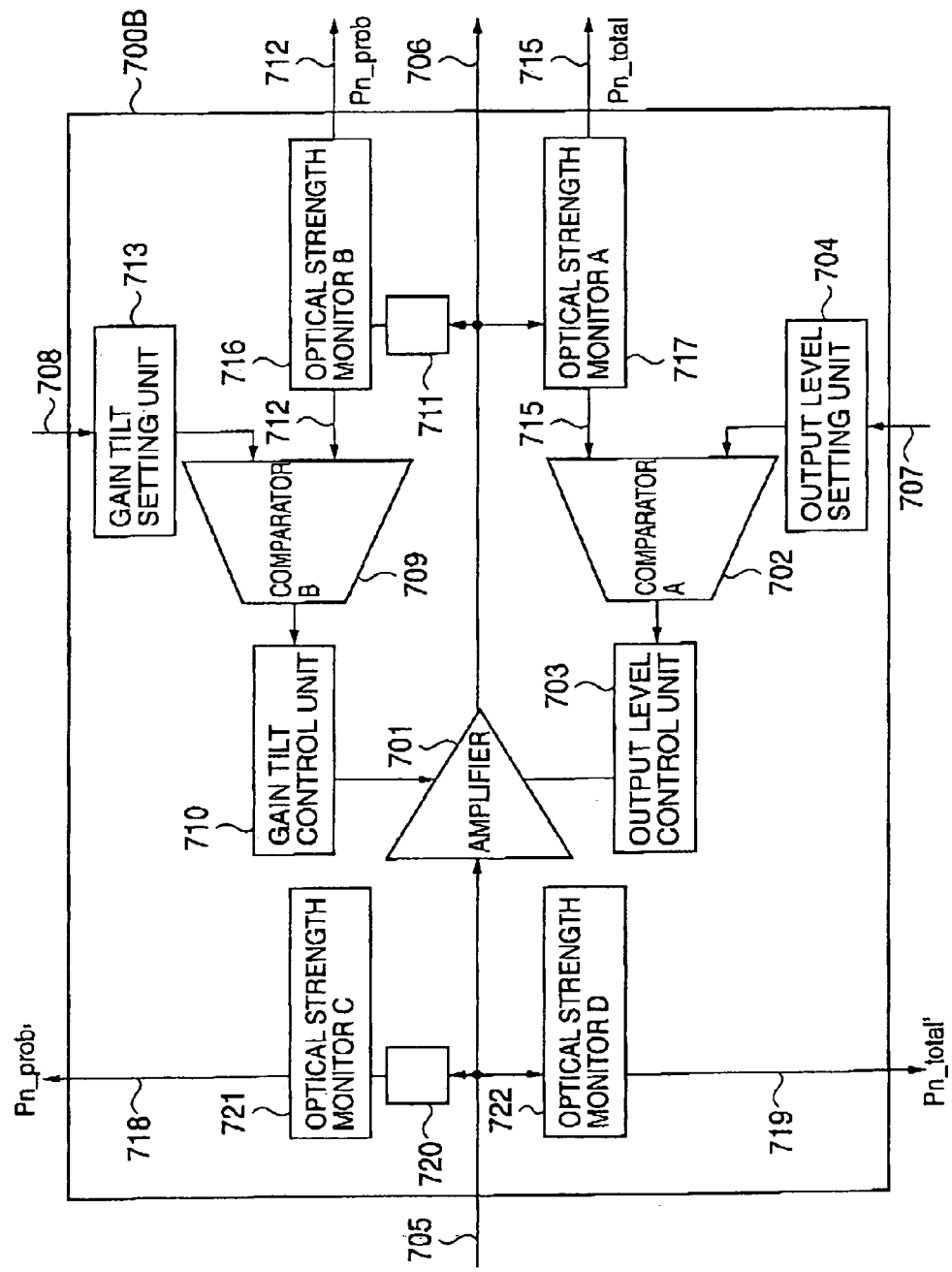
FIG. 13 is a diagram illustrating a second preferred embodiment of the optical amplifier according to the current invention.

Now referring to FIG. 13, a diagram illustrates a second preferred embodiment of the optical amplifier according to the current invention. The diagram illustrates that an optical amplifier 700B monitors an input optical strength Pn_total' 719 and an input probe optical strength Pn_prob' 718 for an optical wavelength signal that is included in a predetermined amplification range. The diagram also illustrates that the optical amplifier 700B monitors a total output optical strength 715 and an output probe optical strength 712 for an optical wavelength signal that is included in a predetermined amplification range. In general, the optical amplifier 700B simultaneously controls the total output optical strength 715 in the amplification range and the gain tilt. In particular, an amplifier 701 amplifies an optical input signal 705 and outputs an optical output signal 706. An output level control unit 703 controls the output strength of the amplifier 701 while a gain tilt control unit 710 controls the gain tilt of the amplifier 701. An output level setting unit 704 stores an external signal 707 for specifying a target optical output signal strength level. A gain tilt setting unit 713 stores an external signal 708 for specifying the gain tilt. A narrow optical range filter 711 filters out a certain wavelength probe signal from the amplified output signal from the amplifier 701 and inputs the filtered wavelength probe signal to an optical strength monitor B 716. The optical strength monitor B 716 converts the optical wavelength probe signal to an electrical signal Pn_prob 712.

Similarly, an optical strength monitor A 717 receives the amplified output signal from the amplifier 701 and converts the optical signal to an electrical signal Pn_total 715. A comparator B compares the gain tilt from the gain tilt setting unit 713 and the electrical signal Pn_prob 712 from the optical strength monitor B 716. The output of the comparator B 709 is inputted into a gain tilt control unit 710. Based upon the comparison result from the comparator B 709, the gain tilt control unit 710 automatically controls the amplifier 701 so as to generate the optical probe signal Pn-prob 712 at a level that is stored in the gain tilt setting unit 713. If the above comparison result from the comparator B 709 is negative, the control performs to negate the negative in the output. On the other hand, a comparator A compares the optical output strength from the target output level setting unit 704 and the electrical signal Pn_total 715 from the optical strength monitor A 717. The output of the comparator A 702 is inputted into an output level control unit 703. Based upon the comparison result from the comparator A 702, the output level control unit 703 automatically controls the amplifier 701 so as to generate the optical output signal 706 at a level that is stored in the output level setting unit 707. If the above comparison result from the comparator A 702 is negative, the control performs to negate the negative in the output.

Still referring to FIG. 13, the second preferred embodiment of the optical amplifier according to the current invention further includes an additional pair of monitoring units at the input side. A narrow optical range filter 720 filters out a certain wavelength probe signal from the input signal 705 and inputs the filtered wavelength probe signal to an optical strength monitor C 721. The optical strength monitor C 721 converts the optical wavelength probe signal to the electrical signal Pn_prob' 718. Similarly, an optical strength monitor D 722 receives the input signal 705 to the amplifier 701 and converts the optical input signal 705 to an electrical signal Pn_total' 719.

Figure 14:
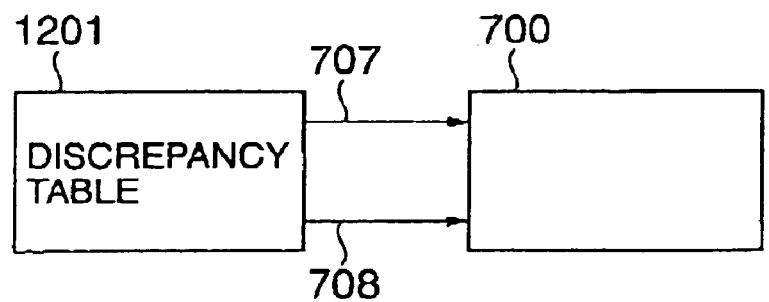
FIG. 14 is a diagram illustrating that the second preferred embodiment further includes a discrepancy table.

In addition, the second preferred embodiment further includes a discrepancy table 1201 as shown in FIG. 14. The discrepancy table 1201 is connected to the optical amplifier 700B via a first input line 708 to the gain tilt setting unit 713 and a second input line 707 to the output level setting unit 704. Based upon the stored data in the discrepancy table 1201, the output level setting unit 704 receives a desired output level value to be stored. Similarly, the gain tilt setting unit 713 receives a desired gain tilt value to be stored. The output level values and the gain tilt values are calculated in advance and stored in the discrepancy table 1201 rather than being determined on the fly. The above values are determined in a manner that will be discussed later.

In the second preferred embodiment of the optical amplifier according to the current invention, an exemplary optical signal is essentially identical at the output side as illustrated in FIG. 5. The optical signal includes four bands or frequency ranges B, R, L1 and L2. For each of the bands B, R, L1 and L2, the total optical strength level includes a B-band total optical strength level 810, a R-band total optical strength level 811, a L1-band total optical strength level 812 and a L2-band total optical strength level 813. The average optical strength level includes a B-band average optical strength level 806, a R-band average optical strength level 807, a L1-band average optical strength level 808 and a L2-band average optical strength level 809. Furthermore, for each band, an optical probe signal is determined and includes a B-band optical probe signal 814, a R-band optical probe signal 815, a L1-band optical probe signal 816 and a L2-band optical probe signal 817. Certain parameters are determined based upon a comparison of the above described values. By comparing the average optical strength level and the optical probe signal for each band, a gain tilt is determined between the bands at the output side. Between the B-band and the R-band, a B-R inter band gain tilt is determined to be a gain tilt 802. Similarly, between the R-band and the L1-band, a R-L1inter band gain tilt is determined to be a gain tilt 804. Between the L1-band and the L2-band, a L1–L2inter band gain tilt is determined to be a gain tilt 805. By comparing the average optical strength level and the optical probe signal for each band, a gain tilt is determined within each of the bands. An inter-band gain tilt 818 is determined for the B-band while an inter-band gain tilt 819 is determined for the R-band. To clearly define the R inter-band tilt gain 819, a portion of the diagram that corresponds to the R-band is enlarged. The R inter-band tilt gain 819 is a difference between the R-band optical probe signal 815 and the R-band average optical strength level 807. Similarly, an inter-band gain tilt 820 is determined for the L1-band while an inter-band gain tilt 821 is determined for the L2-band. The above described parameters are simultaneously determined.

Figure 8:
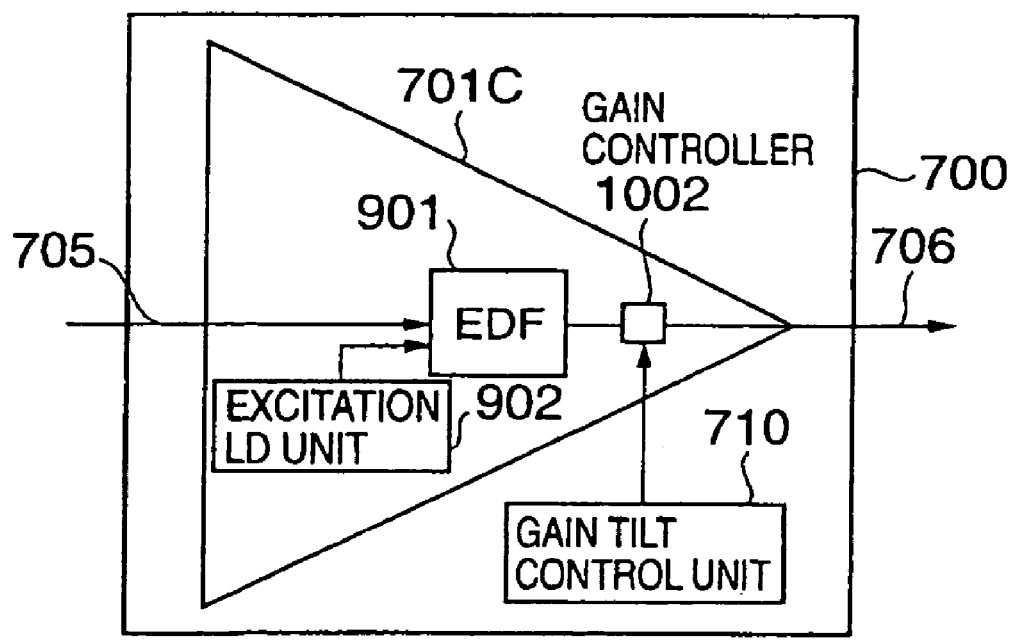
FIG. 8 is a diagram illustrating yet another exemplary implementation of the above described gain tilt control in the preferred embodiment according to the current invention.

The second preferred embodiment of the optical amplifier is further implemented according to the current invention. As shown in FIG. 6, the amplifier 701A further includes an EDF 901 and an excitation LD unit 902. The output level control unit 703 inputs a signal indicative of the desired output level into the excitation LD unit 902, which in turn excites the EDF 901 for amplifying the input optical signal 705 to the output optical signal 706. Alternatively, as shown in FIG. 7, the amplifier 701B further includes an EDF 901, an excitation LD unit 902 and a variable attenuator 1001. The output level control unit 703 inputs a signal indicative of the desired output level into the attenuator 1001, which in turn attenuates an optical output signal from the EDF 901 after amplifying the input optical signal 705 via an excitation LD unit 902. Lastly, as shown in FIG. 8, yet another exemplary implementation of the amplifier 701C further includes an EDF 901, an excitation LD unit 902 and a variable gain tilt adjustment unit 1002. The gain tilt control unit 710 inputs a signal indicative of the desired gain tilt level into the gain tilt adjustment unit 1002, which in turn adjusts an optical output signal from the EDF 901 after amplifying the input optical signal 705 via an excitation LD unit 902. The variable gain tilt adjustment unit 1002 adjusts the output strength among optical signals with a variable wavelength.

Figure 15:
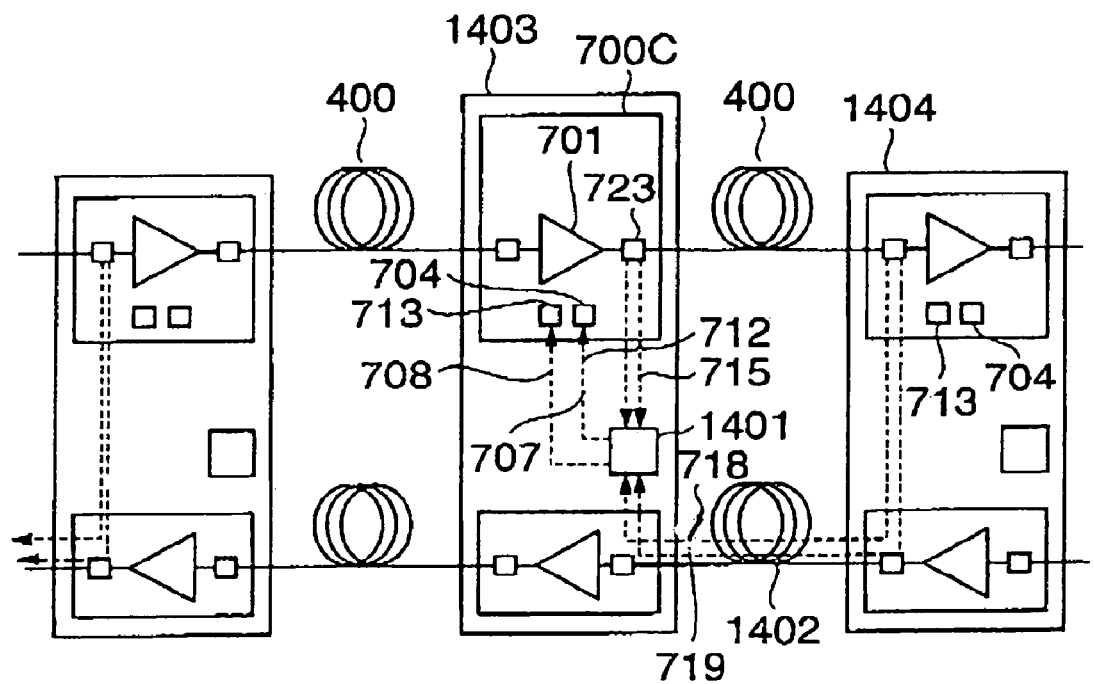
FIG. 15 is a diagram illustrating a third preferred embodiment of the optical amplifier according to the current invention.

Now referring to FIG. 15, a diagram illustrates a third preferred embodiment of the optical amplifier according to the current invention. The third preferred embodiment of the optical amplifier is used as the preamplifier 103 or the line amplifier 203. In a first WDM system 1403, the third preferred embodiment of the optical amplifier 700C further includes an amplifier 701, an optical monitor 723, an output level setting unit 704, a gain tilt setting unit 713 and a central processing unit (CPU) 1401. The first WDM system 1403 is connected to a second WDM system 1404 via optical fibers 400, 1402. The CPU 1401 receives a total input optical strength signal $Pn\_total'$ 719 and an input optical probe signal $Pn\_prob'$ 718 via the optical fiber 1402 from the second WDM system 1404. In the optical fibers 1402, the total input optical strength signal $Pn\_total'$ 719 and the input optical probe signal $Pn\_prob'$ 718 are transmitted in the opposite direction towards the first WDM system 1403 from the second WDM system 1404. The The total input optical strength signal $Pn\_total'$ 719 and the input optical probe signal $Pn\_prob'$ 718 are transmitted on the optical service channel (OSC) in the optical fibers 1402. CPU 1401 also receives a total output optical strength signal $Pn\_total$ 715 and an output optical probe signal $Pn\_prob$ 712. Based upon the above signals, the CPU 1401 calculates a pair of control signals and respectively transmits an output control signal 707 and a gain tilt control signal 708 to the output level setting unit 704 and the gain tilt setting unit 713. The output level setting unit 704 and the gain tilt setting unit 713 store the received signal.

Still referring to FIG. 15, the central processing unit 1401 generates the above described control signals. To generate the control signals, the central processing unit 1401 determines that the total optical output level of the frequency bands in the optical fiber is constant. That is, as shown in the following Equation(2):

$$\sum_{n=1}^{N} Pn\_tota + Pn\_tota' = constant$$

Furthermore, the determination is based upon the total output strength $Pn\_total$ (n=1, 2, ... N) of each band and the total input optical strength $Pn\_total$ (n=1, 2, ... N) for the corresponding optical amplifiers. n=1, 2, ... N and n indicates a particular band from a predetermined set of ranges of frequencies for the optical signals. In other words, the control is performed to hold the following Equations(3) true:

$$P1\_total + P1\_total' = P2\_total + P2\_total'$$
$$= P3\_total + P3\_total'$$
$$= \ldots$$
$$= Pn\_total + Pn\_total'$$

where n=1, 2, ... N and n indicates a particular band from a predetermined set of ranges of frequencies for the optical signals. The sum of the total optical strength $Pn\_'$ total at a transmission unit before transmission and the total optical strength $Pn\_total'$ at a receiving unit after transmission is identical among the frequency bands (n=1, 2, ... n).

Figure 16A:
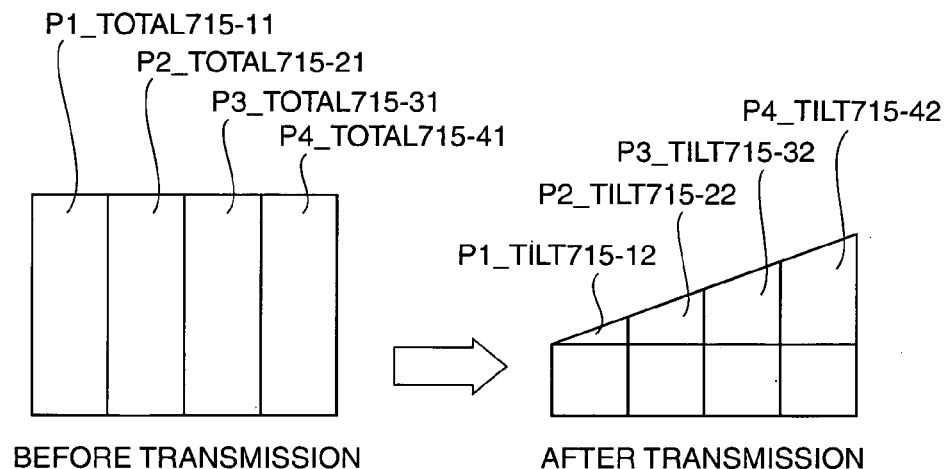
FIGS. 16A and 16B are diagrams illustrating the effect of the control as expressed in Equation 3.
Figure 16B:
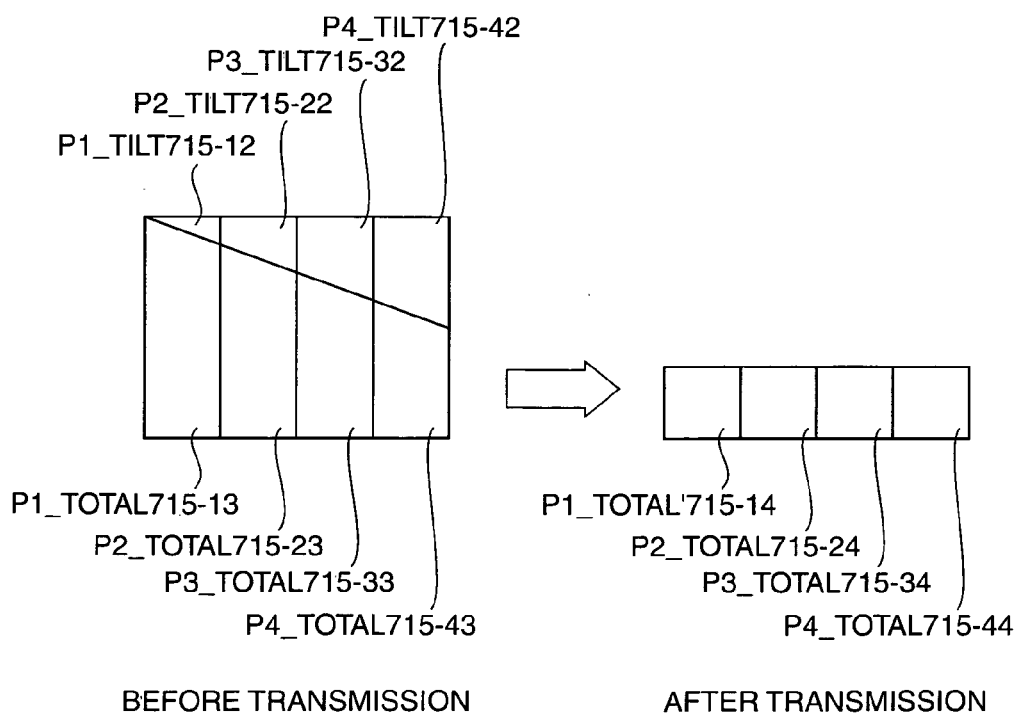

Now referring to FIGS. 16A and 16B, diagrams illustrate the effect of the control as expressed in Equation (3). A left diagram in FIG. 16A illustrates an optical signal whose optical strength level is even across the bands P1_total 715-11 through P4_total 715-41 before transmission from an amplifier on the transmission side. During transmission, the optical signal is affected by the SRS in the optical fiber. A right diagram in FIG. 16A illustrates the optical signal whose optical strength level is uneven across the bands P1_titlt 715-12 through P4_titlt 715-42 after transmission to a receiving unit from the amplifier on the transmission side. To compensate the above gain tilt after transmission, a left diagram in FIG. 16B illustrates an optical signal whose optical strength level is processed to be uneven across the bands P1_total 715-13 through P4_total 715-43 before transmission via amplifier control. In other words, the optical strength portions P1_titlt 715-12 through P4_titlt 715-42 are respectively subtracted from the original even optical signal across the bands P1_total 715-13 through P4_total 715-43. As a result of the above pre-compensation, a right diagram in FIG. 16B illustrates the optical signal whose optical strength level is now even across the bands P1_total' 715-14 through P4_total' 715-44 after transmission to a receiving unit from the amplifier on the transmission side. As described above, to compensate the gain tilt in each band at the receiving unit due to the SRS effect, the same amount of the gain tilt in the opposite direction is compensated at the transmission side in advance of transmission.

In addition, the gain tilt control unit uses the probe optical input Pn_prob and the total input optical strength Pn_total that is from an optical amplifier input portion that is located adjacent to the optical amplifier to be controlled. The gain tilt control in the optical amplifier is expressed by the following Equation(4):

(Pn_total+Pn_total')/(a number of wavelengths)=Pn_prob+Pn_prob' where n=1, 2, . . . N and n indicates a particular band from a predetermined set of ranges of frequencies for the optical signals. The following Equations(5) and (6) express the control that is applied to the post amplifiers depending upon necessity in order to flatten the gain tilt within a band or among the bands.

P1_total=P2_total=P3_total=P4_total

Pn_prob=Pn_total/(a number of wavelengths)

where n=1, 2, . . . N and n indicates a particular band from a predetermined range of frequencies for the optical signals.

Figure 17:
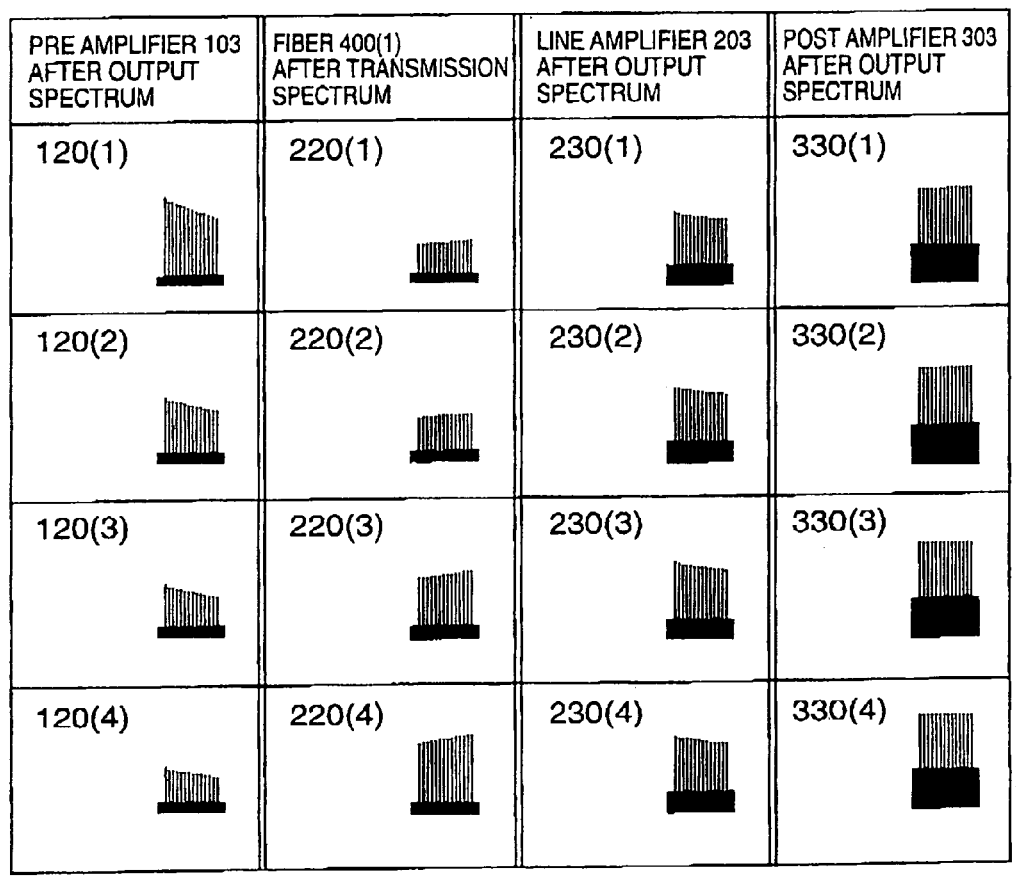
FIG. 17 is a diagram illustrating the effects of the SRS at various points in the transmission and the processing results by the third preferred embodiment of the optical amplifier according to the current invention.

Now referring to FIG. 17, a diagram illustrates the effects of the SRS at various points in the transmission and the processing results by the third preferred embodiment of the optical amplifier according to the current invention. The various points include the preamplifier, the line amplifier and the post amplifier as shown in FIG. 3. The exemplary signal includes four bands as illustrated in FIG. 2 and is transmitted in the above transmission path. In general, the output strength from the intermediate optical amplifiers is adjusted so that the optical signal to noise ratio (SNR) is substantially identical among the bands in the output from the last post amplifier. As the result of the above correction, the optical SNR is guaranteed within the bands and between the bands.

Figure 18A:
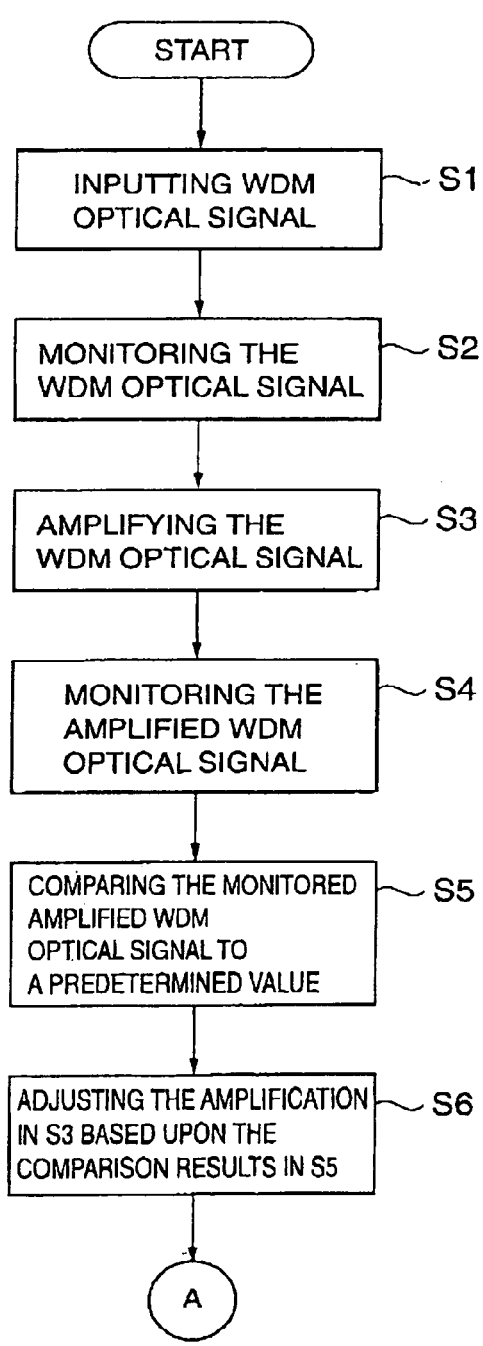
FIGS. 18A and 18B are a flow chart illustrating steps involved in a preferred process of adjusting the amplification of a wavelength division multiplexed (WDM) optical signal according to the current invention.
Figure 18B:
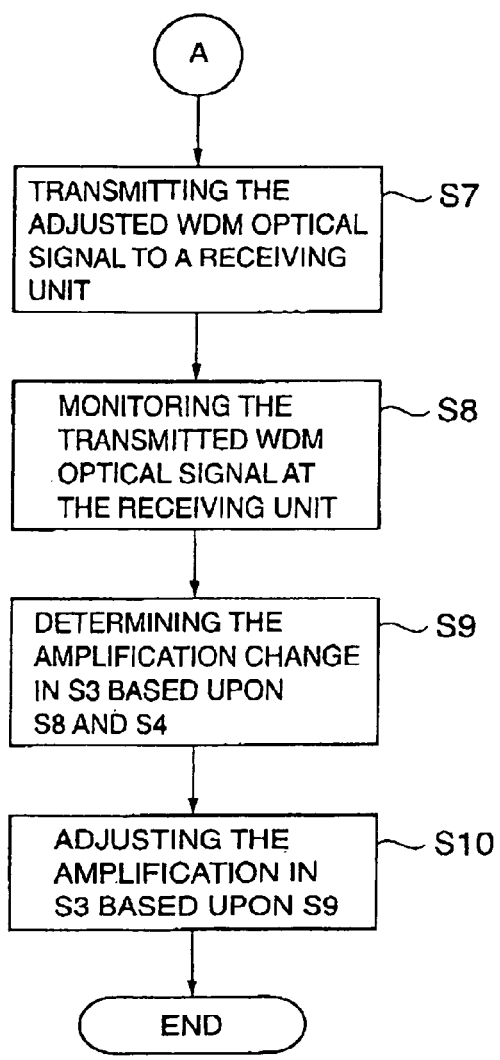

FIGS. 18A and 18B are a flow chart illustrating steps involved in a preferred process of adjusting the amplification of a wavelength division multiplexed (WDM) optical signal according to the current invention. In general, the preferred process adjusts the amplification of the WDM optical signal during a transmission over a predetermined distance so that the transmitted signal experiences a minimal amount of signal loss as well as gain tilt. The preferred process is described with respects to the above described units of the first, second and third preferred embodiments as respectively shown in FIGS. 4, 13 and 15. Referring to FIG. 18A, in a step S1, a WDM optical signal is inputted into the amplifier unit 700A, 700B or 700C. The optical strength monitors C 721 and D 722 respectively monitor a probe optical strength level and a total optical strength level prior to amplification in a step S2. The amplifier 701 amplifies the WDM optical signal according to a specified output level and a gain tilt in step S3. While the amplification in the step S3 takes place, the optical strength monitors A 717 and B 716 monitor the amplified WDM optical signal from the amplifier 701 in S4. The comparators A 702 and B 709 respectively compare the corresponding monitored optical signal to a relevant predetermined value in a step S5. In particular, the comparator A 702 compares the total optical strength to a predetermined output level value while the comparator B 709 compares the probe optical strength to a predetermined gain tilt value. The comparison results are used to adjust the amplification characteristics of the amplifier 701 in a step S6.

Now referring to FIG. 18B, additional steps are further performed in the preferred process. After the WDM optical signal is appropriately amplified, the amplified WDM optical signal is transmitted towards a receiving unit via an optical fiber in a step S7. The distance for the transmission in the step S7 is a span. At the receiving unit, the transmitted WDM optical signal is monitored in a step S8, and the monitored results are fed back to the amplifier unit 700C. Based upon the above monitored results from the receiving unit in the step S8 and the monitored results from the step S4, the CPU 1401 determines the adjustment characteristics for the amplifier 701 in a step S9. Finally, based upon the above determined characteristic from the step S9, the amplifier 701 is adjusted in a step S10.

In the first, second and third preferred embodiment, a separate optical amplifier is provided for each of the bands in the WDM transmission system. In an alternative embodiment, a series of common optical amplifiers is used for all of the bands, and every one or certain ones of the optical amplifiers is adjusted for gain tilt so as to substantially reduce the OSNR.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of controlling optical signal during transmission between a first unit and a second unit, comprising the steps of:

transmitting a wave division multiplexed optical signal having a predetermined set of ranges of wavelengths from the first unit to the second unit;

amplifying the wave division multiplexed optical signal at the first unit to generate an amplified wave division multiplexed optical signal;

monitoring a first average value of a total optical strength level of at least one of the ranges of the amplified wave division multiplexed optical signal at the first unit;

monitoring a first probe optical strength level of at least one of the wavelengths of the amplified wave division multiplexed optical signal at the first unit;

monitoring at a second unit a second average value of a total optical strength level of the at least one of the ranges of a received wave division multiplexed optical signal from the first unit;

monitoring at the second unit a second probe optical strength level of the at least one of the wavelengths of the received wave division multiplexed optical signal from the first unit;

transmitting the second average value of a total optical strength level and the second probe optical strength level from the second unit to the first unit; and adjusting said amplification at the first unit so that a sum of the first average value and the second average value of the total optical strength level is substantially matched with a sum of the first probe optical strength level and the second probe optical strength level in order to substantially reduce a gain tilt and an optical signal-to-noise ratio in the amplified wave division multiplexed optical signal.

2. The method of controlling optical signal during transmission according to claim 1 wherein said adjusting further comprising the steps of:
comparing the probe optical strength level to a predetermined gain tilt value to generate a first comparison result; and
controlling said amplifying step based upon the first comparison result.

3. The method of controlling optical signal during transmission according to claim 1 wherein the predetermined gain tilt value is retrieved from a storage table.

4. The method of controlling optical signal during transmission according to claim 1 wherein said adjusting further comprising the steps of:
comparing the total optical strength level to a predetermined output level value to generate a second comparison result; and
controlling said amplifying step based upon the second comparison result.

5. The method of controlling optical signal during transmission according to claim 1 wherein the predetermined output level value is retrieved from a storage table.

6. The method of controlling optical signal during transmission according to claim 1 further comprising additional steps of:
transmitting the amplified wave division multiplexed optical signal to a receiving unit via an optical fiber of a predetermined length;
monitoring a transmitted total optical strength level of at least one of the ranges of the amplified wave division multiplexed optical signal at the receiving unit after said transmitting step; and
monitoring a transmitted probe optical strength level of at least one of the wavelengths of the amplified wave division multiplexed optical signal at the receiving unit after transmitting step.

7. The method of controlling optical signal during transmission according to claim 6 wherein a sum of the input total optical strength level at a transmission unit before transmission and the transmitted probe optical strength level at the receiving unit after the transmission substantially is identical.

8. The method of controlling optical signal during transmission according to claim 6 wherein a sum of the input probe optical strength level at a transmission unit before transmission and the transmitted probe optical strength level at the receiving unit after the transmission is substantially identical.

9. The method of controlling optical signal during transmission according to claim 1 further comprising additional steps of:
transmitting the amplified wave division multiplexed optical signal to a receiving unit via an optical fiber of a predetermined length;
monitoring a transmitted total optical strength level of at least one of the ranges of the amplified wave division multiplexed optical signal at the receiving unit after said transmitting step; and
monitoring a transmitted probe optical strength level of at least one of the wavelengths of the amplified wave division multiplexed optical signal at the receiving unit after transmitting step.

10. The method of controlling optical signal during transmission according to claim 9 wherein said amplifying step is adjusted based upon the total optical strength level, the probe optical strength level, the transmitted total optical strength level and the transmitted probe optical strength level.

11. The method of controlling optical signal during transmission according to claim 1 wherein said amplifying step is adjusted with respect to an output level of the amplified wave division multiplexed optical signal.

12. The method of controlling optical signal during transmission according to claim 1 wherein said amplifying step is adjusted with respect to a gain tilt of the amplified wave division multiplexed optical signal.

13. The method of controlling optical signal during transmission according to claim 1 wherein a number of wavelengths is counted.

14. The method of controlling optical signal during transmission according to claim 1 wherein a selected one of the wavelengths in monitoring the probe optical strength level is the shortest one of the wavelengths.

15. The method of controlling optical signal during transmission according to claim 1 wherein a selected one of the wavelengths in monitoring the probe optical strength level is the longest one of the wavelengths.

16. The method of controlling optical signal during transmission according to claim 1 wherein a narrow band optical filter is used for a selected one of the wavelengths in monitoring the probe optical strength level.

17. The method of controlling optical signal during transmission according to claim 1 wherein a pair of photodiodes and a narrow band optical filter are used for implementing the reduction of the gain tilt.

18. A system for controlling optical signal during transmission between a first unit and a second unit via optical fiber, comprising:
said first unit further comprising:
an amplifier connected to said first optical fiber for amplifying a wave division multiplexed optical signal having a predetermined set of ranges of wavelengths according to a predetermined amplification characteristic to generate an amplified wave division multiplexed optical signal, said amplifier outputting the amplified wave division multiplexed optical signal to said second unit;

a first monitor for monitoring a first average value of a total optical strength level of at least one of the ranges of the amplified wave division multiplexed optical signal;

a second monitor for monitoring a first probe optical strength level of at least one of the wavelengths of the amplified wave division multiplexed optical signal; and an adjustment unit connected to said amplifier for adjusting the amplification characteristic of said amplifier;

said second unit further comprising:

a third monitor for monitoring a second average value of the total optical strength level of at least one of the ranges of the received wave division multiplexed optical signal from the first unit; and a fourth monitor for monitoring a second probe optical strength level of at least one of the wavelengths of the received wave division multiplexed optical signal from the first unit;

wherein said second unit sends the second average value of the total optical strength level and the second probe optical strength level to said first unit, and said adjustment unit adjusts the amplification characteristic so that a sum of the first average value and the second average value of the total optical strength level substantially matches a sum of the first probe optical strength level and the second probe optical strength level in order to substantially reduce a gain tilt and an optical signal to noise ration in the amplified wave division multiplexed optical signal.

19. The system for controlling optical signal during transmission according to claim 18 wherein said adjusting unit further comprising:

a first comparator for comparing the probe optical strength level to a predetermined gain tilt value to generate a first comparison result; and a first controlling unit connected to said amplifier and said first comparator for controlling the amplification characteristic based upon the first comparison result.

20. The system for controlling optical signal during transmission according to claim 19 further comprising a first storage unit connected to said first comparator for storing the predetermined gain tilt value.

21. The system for controlling optical signal during transmission according to claim 18 wherein said adjusting unit further comprising:

a second comparator for comparing the total optical strength level to a predetermined output level value to generate a second comparison result; and a second controlling unit connected to said amplifier and said second comparator for controlling said amplification characteristic based upon the second comparison result.

22. The system for controlling optical signal during transmission according to claim 21 further comprising a second storage unit connected to said second comparator for storing the predetermined output level value.

23. The system for controlling optical signal during transmission according to claim 18 further comprising:

a receiving unit connected to said amplifier for receiving the amplified wave division multiplexed optical signal as a transmitted wave division multiplexed optical signal;

a fifth monitor connected to said receiving unit for monitoring a transmitted total optical strength level of one of the ranges of the transmitted wave division multiplexed optical signal at the receiving unit; and a sixth monitor connected to said receiving unit for monitoring a transmitted probe optical strength level of one of the wavelengths of the transmitted wave division multiplexed optical signal.

24. The system for controlling optical signal during transmission according to claim 23 wherein said adjustment unit adjusts said amplifier based upon a combination of the total optical strength level, the probe optical strength level, the transmitted total optical strength level and the transmitted probe optical strength level.

25. The system for controlling optical signal during transmission according to claim 24 wherein said adjustment unit adjusts based upon a sum of the total optical strength level of the amplified wave division multiplexed optical signal at said amplifier before transmission and the transmitted total optical strength level at said receiving unit after the transmission.

26. The system for controlling optical signal during transmission according to claim 24 wherein said adjustment unit adjusts based upon a sum of the probe optical strength level of the amplified wave division multiplexed optical signal at said amplifier before transmission and transmitted probe optical strength level at said receiving unit after the transmission.

27. The system for controlling optical signal during transmission according to claim 18 wherein said adjustment unit adjusts said amplifier with respect to an output level of the amplified wave division multiplexed optical signal.

28. The system for controlling optical signal during transmission according to claim 18 wherein said adjustment unit adjusts said amplifier with respect to a gain tilt of the amplified wave division multiplexed optical signal.

29. The system for controlling optical signal during transmission according to claim 18 wherein said first monitor has information on a number of wavelengths.

30. The system for controlling optical signal during transmission according to claim 18 wherein a selected one of the wavelengths in monitoring the probe optical strength level is the shortest one of the wavelengths.

31. The system for controlling optical signal during transmission according to claim 18 wherein a selected one of the wavelengths in monitoring the probe optical strength level is the longest one of the wavelengths.

32. The system for controlling optical signal during transmission according to claim 18 wherein a narrow band optical filter is used for a selected one of the wavelengths in monitoring the probe optical strength level.

33. The system for controlling optical signal during transmission according to claim 18 wherein said adjustment unit and said second monitor further includes a pair of photodiodes and a narrow band optical filter for substantially reducing the gain tilt.

* * * * *